United States Patent
Choi

(12) 
(10) Patent No.: US 6,554,231 B2
(45) Date of Patent: *Apr. 29, 2003

(54) SPRINKLER MOUNTING DEVICE AND METHOD

(75) Inventor: Jin Lim Choi, Gyoung Gi-Do (KR)

(73) Assignee: Dong-A Flexible Metal Tubes Co., Ltd., Gyoung Gi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/907,105

(22) Filed: Jul. 17, 2001

(65) Prior Publication Data

US 2002/0066834 A1 Jun. 6, 2002

Related U.S. Application Data

(63) Continuation of application No. 09/627,153, filed on Jul. 27, 2000, now Pat. No. 6,260,810.

(30) Foreign Application Priority Data

Aug. 16, 1999 (KR) ............................................. 99/16852

(51) Int. Cl.$^7$ ................................................. F16L 3/08
(52) U.S. Cl. ........................... 248/65; 248/72; 248/343; 248/317; 52/715; 52/506.02; 52/712
(58) Field of Search ............................ 248/65, 72, 343, 248/534, 317, 48.1, 74.1, 68.1, 58, 59, 62; 52/712, 715, 506.07; 24/292, 295

(56) References Cited

U.S. PATENT DOCUMENTS

| | | | |
|---|---|---|---|
| 2,375,513 A | 5/1945 | Bach | 248/72 |
| 3,341,909 A | 9/1967 | Havener | 248/72 |
| 3,556,452 A * | 1/1971 | Ramsey | 248/343 |
| 3,558,091 A * | 1/1971 | Bush | |
| 3,608,857 A | 9/1971 | Hibbeler | 248/317 |
| 3,612,461 A | 10/1971 | Brown | 248/317 |
| 3,652,780 A | 3/1972 | Wilson | 248/72 |
| 3,874,035 A | 4/1975 | Schuplin | 248/72 |
| 4,135,692 A | 1/1979 | Ferguson | 248/317 |
| 4,408,428 A * | 10/1983 | Brooke et al. | |
| 4,544,119 A * | 10/1985 | Kellett et al. | |
| 4,717,099 A | 1/1988 | Hubbard | 248/57 |
| 4,723,749 A | 2/1988 | Carraro et al. | 248/317 |
| 5,595,363 A | 1/1997 | DeLeebeeck | 248/72 |
| 5,667,181 A * | 9/1997 | van Leeuwen et al. | 248/343 |
| 6,260,810 B1 * | 7/2001 | Choi | 248/65 |
| 6,345,800 B1 * | 2/2002 | Herst et al. | 248/342 |

* cited by examiner

Primary Examiner—Kimberly Wood
(74) Attorney, Agent, or Firm—Thompson Coburn LLP

(57) ABSTRACT

A mounting device for mounting a reducer support beam of a sprinkler system to a ceiling support rail of a drop ceiling in a building. The mounting device comprises an adjustable clamp portion and a mount portion. The clamp portion has opposing ceiling support rail engagement portions separated by a clamping space sized and shaped for receiving a portion of the ceiling support rail of the drop ceiling. The clamp portion is adapted to adjustably move the rail engagement portions relative to one another between a loosened position and a clamped position to vary the clamping space separating the rail engagement portions. The clamping space is sized to receive the ceiling support rail when the rail engagement portions are in the loosened position. The rail engagement portions are adapted to securely engage the ceiling support rail when the rail engagement portions are in the clamped position. The mount portion has opposing reducer support beam engagement portions separated by a mounting space sized and shaped for receiving at least a portion of the reducer support beam of the sprinkler system.

15 Claims, 3 Drawing Sheets

SPRINKLER MOUNTING DEVICE AND METHOD

CROSS-REFERENCE TO RELATED APPLICATION

This is a continuation of U.S. patent application Ser. No. 09/627,153 filed Jul. 27, 2000, now U.S. Pat. No. 6,260,810 entitled, "Sprinkler Mounting Device" which is hereby incorporated by reference in its entirety.

BACKGROUND OF THE INVENTION

The present invention relates to sprinkler mounting devices and, more particularly, to a device for mounting a reducer support beam of a sprinkler to a ceiling support rail in a building.

As well known to those skilled in the art, a conventional drop ceiling support structure comprises a plurality of ceiling support rails extending horizontally below the roof of a building. Ceiling panels are positioned between the ceiling support rails to form a drop ceiling. When a sprinkler system is installed, a reducer support beam is mounted between adjacent ceiling support rails at desired positions to hold each reducer of the sprinkler system in position relative to the drop ceiling. A sprinkler mounting device holds each end of the reducer support beam to a respective ceiling support rail.

A conventional sprinkler mounting device used for mounting the ends of a reducer support beam to the ceiling support rails has an inverted U-shaped profile defined by one top wall and two sidewalls extending downward from opposite ends of the top wall. The top wall and sidewalls define a fitting channel which receives the ceiling support rail. The conventional sprinkler mounting device may also have a locking projection extending inward from a lower portion of at least one sidewall to lock the mounting device to the ceiling support rail. The fitting projection engages a hole in the ceiling support rail to lock the mounting device to the rail. The top wall includes a bolt hole for receiving a locking bolt. A notch is formed in an upper portion of the mounting device for receiving the reducer support beam.

To mount opposite ends of a reducer support beam to desired ceiling support rails, two sprinkler mounting devices are fitted over adjacent ceiling support rails prior to inserting opposite ends of the reducer support beam in the notch in each mounting device. The locking bolt of each mounting device is tightened to urge the reducer support beam downward against the lower edge of the respective notch to fix the position of the reducer support beam relative to the two mounting devices.

Conventional sprinkler mounting devices such as described above are problematic in that they do not securely fasten the device to the ceiling support rails. In addition, when the locking bolt is over tightened, the conventional mounting device may deform around the fitting channel and/or the notch, allowing the reducer support beam to become loose even when subjected to a small impact. Further, because the conventional sprinkler mounting devices are not adjustable, they can only be used with ceiling support rails having specific sizes and shapes. Thus, manufacturers and users of the conventional devices must stock a variety of mounting devices having different sizes and shapes to accommodate ceiling support rails of different sizes and shapes. Accordingly, the conventional sprinkler mounting devices are very inconvenient to manufacturer and use.

SUMMARY OF THE INVENTION

Among the several objects and features of the present invention may be noted the provision of a sprinkler mounting device which securely mounts a reducer support beam of a sprinkler to a ceiling support rail in a building; the provision of a sprinkler mounting device which securely mounts a reducer support beam to ceiling support rails having differing sizes and shapes; and the provision of a method for securely mounting a reducer support beam of a sprinkler to a ceiling support rail.

Generally, a mounting device of the present invention for mounting a reducer support beam of a sprinkler system to a ceiling support rail of a drop ceiling in a building comprises an adjustable clamp portion and a mount portion. The clamp portion has opposing ceiling support rail engagement portions separated by a clamping space sized and shaped for receiving a portion of the ceiling support rail of the drop ceiling. The clamp portion is adapted to adjustably move the rail engagement portions relative to one another between a loosened position and a clamped position to vary the clamping space separating the rail engagement portions. The clamping space is sized to receive the ceiling support rail when the rail engagement portions are in the loosened position. The rail engagement portions are adapted to securely engage the ceiling support rail when the rail engagement portions are in the clamped position. The mount portion has opposing reducer support beam engagement portions separated by a mounting space sized and shaped for receiving at least a portion of the reducer support beam of the sprinkler system.

Another aspect of the present invention comprises a method of mounting a reducer support beam of a sprinkler system to a ceiling support rail of a drop ceiling in a building. The method comprises providing a mounting device comprising an adjustable clamp portion and a mount portion. The adjustable clamp portion has opposing ceiling support rail engagement portions separated by a clamping space sized and shaped for receiving at least a portion of the ceiling support rail of the drop ceiling. The clamp portion is adapted to adjustably move the rail engagement portions relative to one another between a loosened position and a clamped position to vary the clamping space separating the rail engagement portions. The clamping space is sized to receive said portion of the ceiling support rail when the rail engagement portions are in the loosened position. The rail engagement portions are adapted to securely engage said portion of the ceiling support rail when the rail engagement portions are in the clamped position. The mount portion has opposing reducer support beam engagement portions separated by a mounting space sized and shaped for receiving at least a portion of the reducer support beam of the sprinkler system. The method further comprises: positioning the mounting device relative to the ceiling support rail when the rail engagement portions are in the loosened position such that said portion of the ceiling support rail is in the clamping space; moving at least one of the rail engagement portions relative to the other of the rail engagement portions to position the rail engagement portions in the clamped position when said portion of the ceiling support rail is in the clamping space such that the rail engagement portions securely engage said portion of the ceiling support rail; and positioning the mount portion relative to the reducer support beam of the sprinkler system such that said portion of the reducer support beam is in the mounting space.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
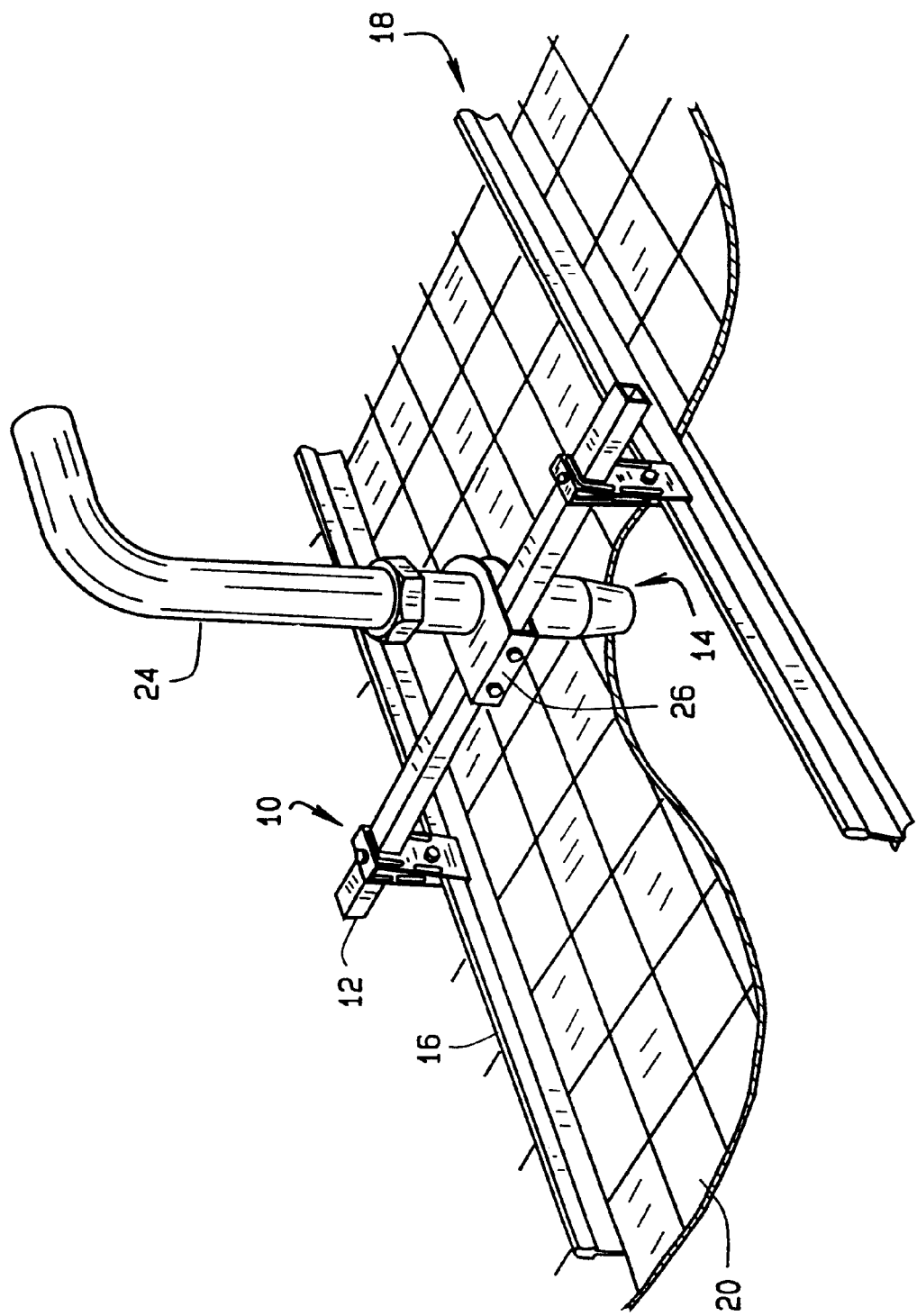
FIG. 1 is a perspective view of two mounting devices of the present invention mounting a reducer support beam to ceiling support rails.

As illustrated in FIG. 1, a mounting device of the present invention is designated in its entirety by the reference numeral 10. The mounting device 10 is used to mount a conventional reducer support beam 12 of a sprinkler system, generally designated by 14, to a conventional ceiling support rail 16 of a drop ceiling, generally designated by 18, in a building (not shown). The ceiling support rails 16 extend horizontally parallel to the ceiling (not shown) of the building. Ceiling panels 20 are held between the ceiling support rails 16 to form the drop ceiling 18. The reducer support beam 12 is mounted between adjacent ceiling support rails 16 at desired positions to hold each reducer 22 of the sprinkler system 14 in position relative to the drop ceiling 18. One mounting device 10 supports each end of the reducer support beam 12 of the sprinkler system 14. A conventional sprinkler head (not shown) is attached to the lower end of each reducer 22 and a pipe 24 is attached to the upper end of each reducer for delivering water or other fire suppressant to the sprinkler head. The sprinkler reducer 22 is held on the reducer support beam 12 by a conventional bracket 26 mounted between the ends of the support beam.

Figure 2:
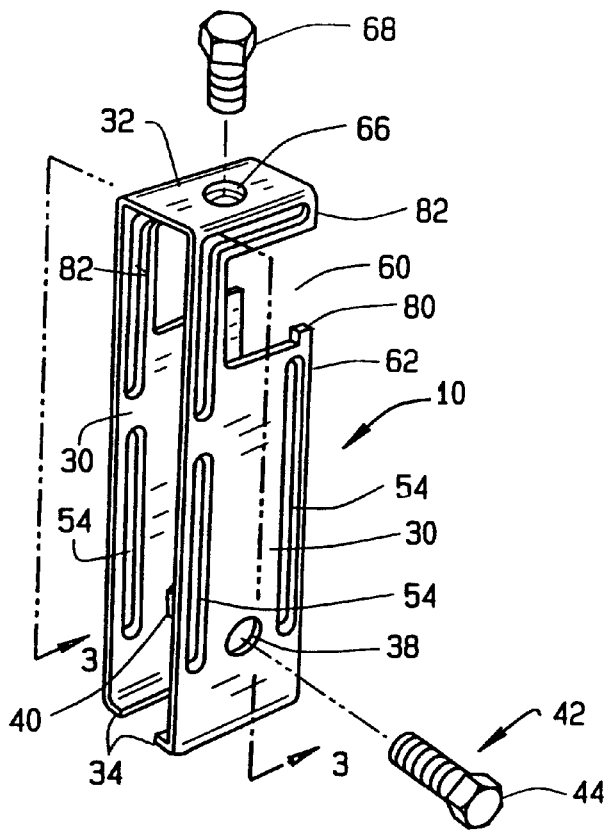
FIG. 2 is a perspective view of one of the mounting device of FIG. 1.
Figure 3:
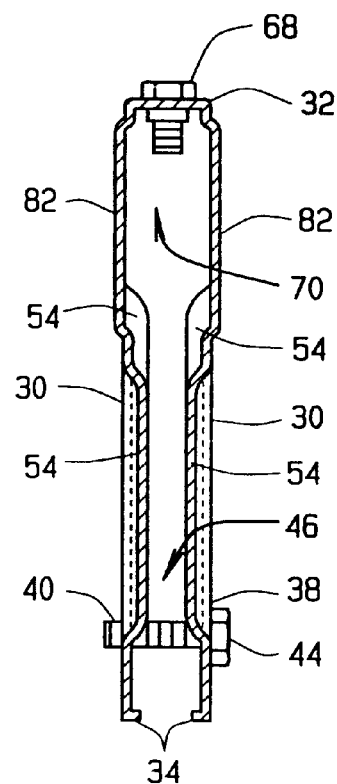
FIG. 3 is a cross sectional view taken along the plane of line A—A of FIG. 2.

As illustrated in FIGS. 2 and 3, the mounting device 10 preferably comprises two vertical sidewalls 30 joined at their upper ends by a top wall 32 to form an inverted U-shaped structure which may be stamped from sheet metal. The lower ends of the sidewalls 30 preferably comprise inwardly extending clip flanges 34 for gripping a head 36 (FIG. 4) of the ceiling support rail 16 positioned between the sidewalls 30. Bolt holes 38, 40 are formed in each of the sidewalls 30 above the flanges 34. The bolt holes 38, 40 receive a locking bolt or clamp screw fastener, generally designated by 42. The first bolt hole 38 adjacent a head 44 of the bolt 42 preferably has a diameter greater than the threads of the bolt to provide clearance and the second bolt hole 40 opposite the head is threaded so the bolt threadably engages the hole. As will be appreciated by those skilled in the art, this arrangement permits the bolt 42 to bias the sidewalls 30 toward each other as the bolt is turned in one direction (e.g., clockwise) and allows the sidewalls to return to their unbiased position when the bolt is turned in the opposite direction (e.g., counterclockwise). Thus, this preferred arrangement provides an adjustable clamp portion in which the flanges 34 of the sidewalls 30 constitute opposing ceiling support rail engagement portions. As will further be appreciated by those skilled in the art, the rail engagement portions are separated by a clamping space 46 (FIG. 3) sized and shaped for receiving at least a portion (e.g., an end) of a ceiling support rail 16. The clamp portion is adjustable to vary the clamping space 46 to permit the clamping space to be adjusted between a loosened position as shown in FIG. 3 for receiving the ceiling support rail 16 and a clamped position as shown in FIG. 4 for securely clamping the clamp to the ceiling support rail.

Figure 4:
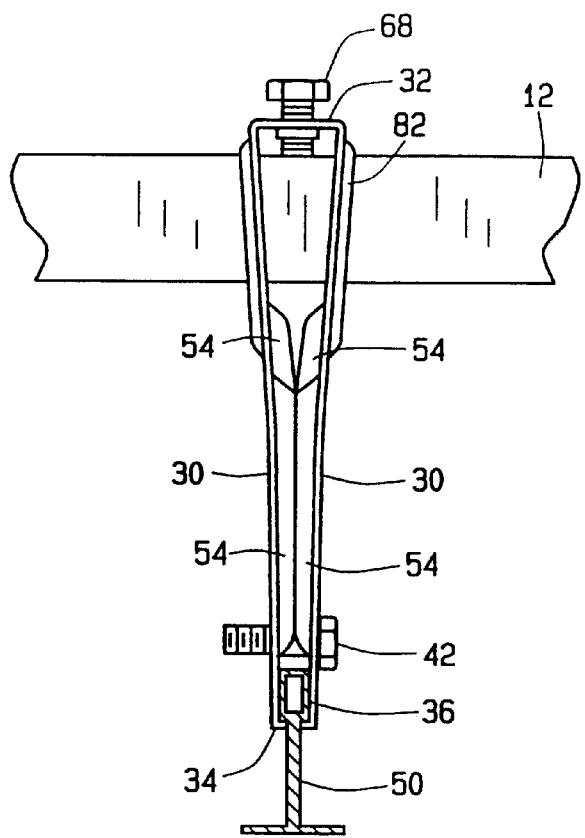
FIG. 4 is a front elevational view of the mounting device of FIG. 2 mounting the reducer support beam to the ceiling support rail.
Figure 5:
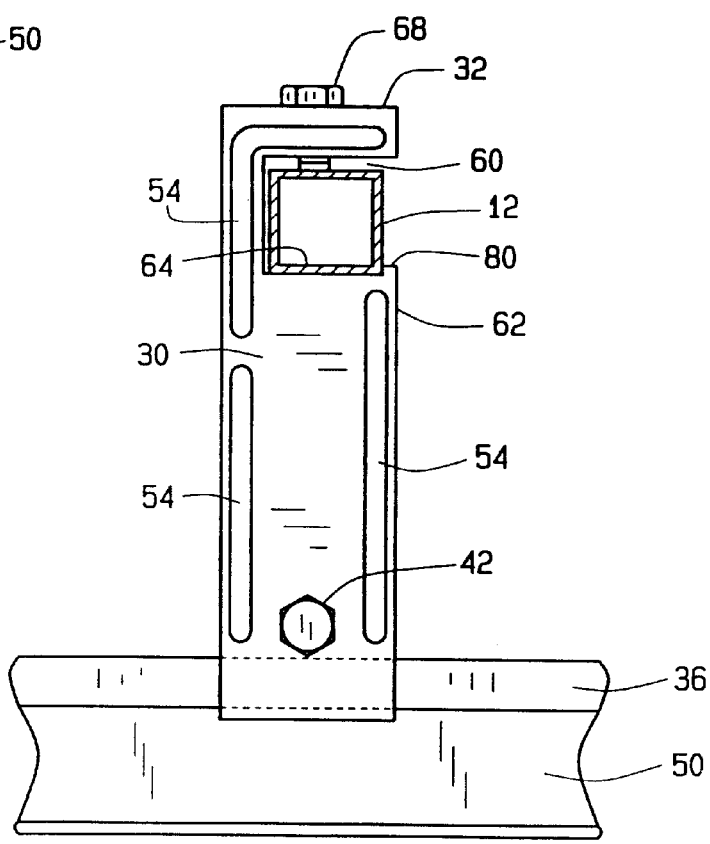
FIG. 5 is a side elevational view of the mounting device of FIG. 4 mounting the reducer support beam to the ceiling support rail.

As shown in FIGS. 4 and 5, the mounting device 10 mounts an end portion of the reducer support beam 12 to a ceiling support rail 16. In order to mount the mounting device 10 to a desired position on the ceiling support rail 16, the mounting device is initially fitted over the ceiling support rail 16 so the flanges 34 of the sidewalls 30 are positioned on opposite sides of a web 50 of the rail 16 below the head 36 of the rail. Once so positioned, the locking bolt 42 is preferably fully threaded into the two bolt holes 38, 40 and tightened so the two sidewalls 30 are biased together to reduce in the clamping space 46 until the flanges 34 engage the head 36 of the rail 16 to securely clamp the mounting device 10 to the rail.

As illustrated in FIG. 4, a projection 54 is formed (e.g., by a pressing process) on an inside surface of each sidewall 30. When the locking bolt 42 is tightened in a manner so the clamp portion is in the clamping position, the projections 54 of the sidewalls 30 contact each other to prevent the clamping space 46 from varying to a spacing less than a predetermined minimum spacing even when the locking bolt 42 is tightened further. This feature prevents the clip flanges 34 from being crushed or bent open when the locking bolt 42 is over-tightened, thus ensuring that the clip flanges securely hold the mounting device 10 to the ceiling support rail 16. As will further be appreciated by those skilled in the art, the projections 54 also act as reinforcing ribs for each sidewall 30.

As illustrated in FIGS. 2 and 5, an opening 60 is formed at an upper end of each sidewall 30. Although the opening 60 may have other shapes without departing from the scope of the present invention, in the preferred embodiment the opening comprises a notch extending from one side edge 62 of the respective sidewall 30. The opening 60 receives an end of the reducer support beam 12 of the sprinkler system 14 so the beam rests against a lower edge 64 of each opening. The top wall 32 preferably has a threaded bolt hole 66 which receives a second locking bolt or mount screw fastener 68. As will be appreciated by those skilled in the art, the openings 60 and bolt 68 form a mount portion of the mounting device 10 having opposing reducer support beam engagement portions. Preferably, the beam engagement portions comprises the lower edges 64 of the openings 60 and the bolt 68 which are separated by a mounting space 70 sized and shaped for receiving the reducer support beam 12 of the sprinkler system 14 therein. When the bolt 68 is advanced, it clamps the beam 12 in position against the lower edges 64 of the openings 60 thereby holding the reducer support beam in the openings of the sidewalls 30. The position of the reducer support beam 12 relative to the two mounting devices 10 is thus fixed.

A stop lug 80 is preferably formed along the lower edge 64 of each opening 60 adjacent the side edge 62 of the sidewall 30 for preventing the reducer support beam 12 from moving out of the opening when the bolt 68 is tightened. In addition, a reinforcing rib 82 preferably extends along each sidewall 30 adjacent the opening 60. Although the rib 82 may have other shapes without departing from the scope of the present invention, the reinforcing rib is preferably formed (e.g., by a pressing process) to bulge outward. The reinforcing rib 82 prevents undesired deformation of the opening 60 and sidewalls 30 when the locking bolt 68 is fully tightened.

In order to mount opposite end portions of a reducer support beam 12 of a sprinkler system between two ceiling support rails 16, two mounting devices 10 are first fixed to the ceiling support rails at desired positions along their lengths. Each mounting device 10 is fitted over the respective ceiling support rail 16 and the respective locking bolt 42 is installed in each mounting device 10 if necessary, and tightened until the respective mounting device is securely clamped to the head 36 of the rail. The reducer support beam 12 of the sprinkler system is inserted in the openings 60 of the mounting devices 10, and the locking bolt 68 of each mount portion is tightened to bias the reducer support beam 12 downward into contact with the lower edges 64 of the openings 60. The position of the reducer support beam 12 relative to the mounting devices 10 is thus fixed so the opposite ends of the reducer support beam are firmly mounted to the desired ceiling support rails 16.

As described above, the sprinkler mounting device of the present invention securely mounts a reducer support beam of a sprinkler system to adjacent ceiling support rails of a drop ceiling in a building. This sprinkler mounting device may be used to securely mount the reducer support beam to ceiling support rails having a wide variety of sizes and shapes. In addition, the sprinkler mounting device is preferably constructed to resist deformation even when its locking bolts are over-tightened.

In view of the above, it will be seen that the several objects of the invention are achieved and other advantageous results attained.

When introducing elements of the present invention or the preferred embodiment(s) thereof, the articles "a," "an," "the" and "said" are intended to mean that there are one or more of the elements. The terms "comprising," "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. An assembly comprising:
   a drop ceiling having a ceiling support rail;
   a sprinkler system having a reducer support beam;
   a mounting device comprising an adjustable clamp portion and a mount portion;
   the adjustable clamp portion having first and second opposing ceiling support rail engagement portions separated by a clamping space sized and shaped for receiving at least a portion of the ceiling support rail of the drop ceiling, the clamp portion being adapted to adjustably move the rail engagement portions relative to one another between a loosened position and a clamped position to vary the clamping space separating the rail engagement portions, the clamping space being sized to receive said portion of the ceiling support rail when the rail engagement portions are in the loosened position, said portion of the ceiling support rail being securely engaged by the rail engagement portions and the rail engagement portions being in the clamped position;
   the mount portion having opposing reducer support beam engagement portions separated by a mounting space sized and shaped for receiving at least a portion of the reducer support beam of the sprinkler system, the reducer support beam engagement portions engaging the reducer support beam.

2. An assembly as set forth in claim 1 wherein the adjustable clamp portion includes a tightening mechanism spaced from the rail engagement portions, the tightening mechanism being operable in a manner to adjustably move the rail engagement portions relative to one another between the loosened and clamped positions to vary the clamping space separating the rail engagement portions, the mounting device being positioned relative to the ceiling support rail such that the tightening mechanism is spaced above the ceiling support rail, the tightening mechanism maintaining the rail engagement portions in the clamped position such that the rail engagement portions securely engage said portion of the ceiling support rail.

3. An assembly as set forth in claim 2 wherein the tightening mechanism comprises a threaded fastener.

4. An Assembly as set fourth in claim 2 wherein the adjustable clamp portion comprises first and second generally downwardly extending sidewalls, the first sidewall having a lower end margin constituting at least a portion of the first ceiling support rail engagement portion.

5. An assembly as set forth in claim 2 wherein the second sidewall has a lower end margin constituting at least a portion of the second ceiling support rail engagement portion.

6. An assembly as set forth in claim 5 wherein the lower end margin of the first sidewall comprises a first inwardly extending flange and the lower end margin of the second sidewall comprises a second inwardly extending flange, the first inwardly extending flange constituting at least a portion of the first ceiling support rail engagement portion, the second inwardly extending flange constituting at least a portion of the second ceiling support rail engagement portion.

7. A assembly as set forth in claim 5 wherein the tightening mechanism is operatively engageable with the first and second sidewalls in a manner to adjustably move the rail engagement portions between their loosened and clamped positions.

8. A assembly as set forth in claim 7 wherein the tightening mechanism comprises a threaded fastener threadably attached to one of the sidewalls.

9. A assembly as set forth in claim 7 wherein the tightening mechanism is moveable between a relaxed position and a tensioned position and wherein the clamp portion further comprises an upper wall operatively connecting the first sidewall to the second sidewall, the sidewalls and the upper wall being adapted and configured such that the rail engagement portions are in their loosened position when the tightening mechanism is in its relaxed position, at least part of the tightening mechanism being in tension when the tightening mechanism is in its tensioned position to urge the rail engagement portions toward the clamped position.

10. An assembly comprising:
    a drop ceiling having a ceiling support rail, the ceiling support rail having an uppermost edge, a lower flange, and a web, the web extending generally upwardly from an intermediate portion of the flange, the flange being adapted to engage edge margins of ceiling panels, the flange having first and second opposite edges, the flange having a width defined by the distance between the first and second opposite edges;
    a sprinkler system having a reducer support beam;
    a mounting device comprising a lower portion adapted to engage the ceiling support rail and an upper portion adapted to engage the reducer support beam;
    the lower portion of the mounting device being secured to the ceiling support rail, the lower portion of the mounting device being defined as that portion of the mounting device which is below the elevation of the uppermost edge of the ceiling support rail when the mounting device is secured to the ceiling support rail, the lower portion of the mounting device having a width which is less than the width of the lower flange of the ceiling support rail such that all parts of the lower portion of the mounting device are laterally between the first and second edges of the flange when the mounting device is secured to the ceiling support rail, the upper portion of the mounting device being secured to the reducer support beam.

11. A method of mounting a reducer support beam of a sprinkler system to a ceiling support rail of a drop ceiling in a building, the method comprising:

providing a mounting device comprising an adjustable clamp portion and a mount portion, the adjustable clamp portion having opposing ceiling support rail engagement portions separated by a clamping space sized and shaped for receiving at least a portion of the ceiling support rail of the drop ceiling, the clamp portion comprising first and second generally downwardly extending sidewalls, the first sidewall having a lower end margin constituting at least a portion of the first ceiling support rail engagement portion, the second sidewall having a lower end margin constituting at least a portion of the second ceiling support rail engagement portion, the lower end margin of the first sidewall comprising a first inwardly extending flange and the lower end margin of the second sidewall comprising a second inwardly extending flange, the first inwardly extending flange constitutes at least a portion of the first ceiling support rail engagement portion, the second inwardly extending flange constitutes at least a portion of the second ceiling support rail engagement portion, the adjustable clamp portion further having a tightening mechanism spaced from the rail engagement portions, the tightening mechanism being operable in a manner to adjustably move the rail engagement portions relative to one another between a loosened position and a clamped position to vary the clamping space separating the rail engagement portions, the clamping space being sized to receive said portion of the ceiling support rail when the rail engagement portions are in the loosened position, the rail engagement portions being adapted to securely engage said portion of the ceiling support rail when the rail engagement portions are in the clamped position, the mount portion having opposing reducer support beam engagement portions separated by a mounting space sized and shaped for receiving at least a portion of the reducer support beam of the sprinkler system;

positioning the mounting device relative to the ceiling support rail when the rail engagement portions are in the loosened position such that said portion of the ceiling support rail is in the clamping space and the tightening mechanism IS spaced above the ceiling support rail;

operating the tightening mechanism to move at least one of the rail engagement portions relative to the other of the rail engagement portions to position the rail engagement portions in the clamped position when said portion of the ceiling support rail is in the clamping space such that the rail engagement portions securely engage said portion of the ceiling support rail; and positioning the mount portion relative to the reducer support beam of the sprinkler system such that said portion of the reducer support beam is in the mounting space.

12. A method as set forth in claim 11 wherein the tightening mechanism comprises a threaded fastener.

13. A method as t forth in claim 11 wherein the tightening mechanism is operatively engageable with the first and second sidewalls in a manner to adjustably move the rail engagement portions between their loosened and clamped positions.

14. A method as set forth in claim 13 wherein the tightening mechanism comprises a threaded fastner threadably attached to one of the sidewalls.

15. A method as set forth in claim 13 wherein the tightening mechanism is moveable between a relaxed position and a tensioned position and wherein the clamp portion further comprises an upper wall operatively connecting the first sidewall to the second sidewall, the sidewalls and the upper wall being adapted and configured such that the rail engagement portions are in their loosened position when the tightening mechanism is in its relaxed position, at least part of the tightening mechanism being in tension when the tightening mechanism is in its tensioned position to urge the rail engagement portions toward the clamped position.

* * * * *